United States Patent
Fazlyab et al.

(10) Patent No.: US 10,608,930 B2
(45) Date of Patent: Mar. 31, 2020

(54) NETWORK STATISTICS ESTIMATION AND PREDICTION

(71) Applicant: Cisco Technology, Inc., San Jose, CA (US)

(72) Inventors: Mahyar Fazlyab, Philadelphia, PA (US); Mehdi Nikkhah, Belmont, CA (US); Mark Allen Webb, Troy, MI (US)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 15/602,928

(22) Filed: May 23, 2017

(65) Prior Publication Data
US 2018/0343177 A1 Nov. 29, 2018

(51) Int. Cl.
*H04L 12/721* (2013.01)
*H04L 12/751* (2013.01)
*H04L 12/24* (2006.01)
*H04L 12/26* (2006.01)

(52) U.S. Cl.
CPC ............ *H04L 45/38* (2013.01); *H04L 41/147* (2013.01); *H04L 45/02* (2013.01); *H04L 43/087* (2013.01); *H04L 43/0888* (2013.01); *H04L 43/10* (2013.01)

(58) Field of Classification Search
CPC ... H04L 43/04; H04L 43/087; H04L 43/0888; H04L 45/38
See application file for complete search history.

(56) References Cited

U.S. PATENT DOCUMENTS

| 2006/0146711 | A1* | 7/2006 | Anbarani | H04L 12/5602 370/235 |
| 2006/0250959 | A1* | 11/2006 | Porat | H04L 45/02 370/230 |
| 2008/0267185 | A1* | 10/2008 | Biskner | H04L 41/142 370/392 |
| 2012/0182865 | A1* | 7/2012 | Andersen | H04L 1/22 370/228 |

(Continued)

OTHER PUBLICATIONS

Y. Liu, et al., "Scalable Fluid Models and Simulations for Large-Scale IP Networks", Journal of ACM Transactions on Modeling and Computer Simulation (TOMACS), vol. 14, Issue 3, ACM TOMACS, Aug. 31, 2004, 25 pages.

(Continued)

*Primary Examiner* — Ivan O Latorre
(74) *Attorney, Agent, or Firm* — Edell, Shapiro & Finnan, LLC

(57) ABSTRACT

A network computing device determines a network topology for at least one network flow path between at least one ingress network border device and at least one egress network border device. The network computing device receives a message containing data indicating flow statistics for the at least one ingress network border device. The network computing device generates flow statistics for at least one network device along the at least one network flow path from the network topology and the flow statistics for the at least one ingress network border device. The network computing device generates the flow statistics for at least one network device along the at least one network flow path without receiving flow statistics from the at least one network device along the at least one network flow path.

20 Claims, 14 Drawing Sheets

(56) References Cited

U.S. PATENT DOCUMENTS

| | | | | |
|---|---|---|---|---|
| 2012/0324123 | A1* | 12/2012 | Fox | G06F 15/781 |
| | | | | 709/231 |
| 2013/0311160 | A1* | 11/2013 | Cowie | H04L 43/04 |
| | | | | 703/13 |
| 2013/0322242 | A1* | 12/2013 | Swenson | H04L 47/11 |
| | | | | 370/232 |
| 2016/0094398 | A1* | 3/2016 | Choudhury | H04L 45/42 |
| | | | | 370/254 |
| 2017/0012902 | A1* | 1/2017 | Shen | H04L 12/6418 |
| 2018/0167458 | A1* | 6/2018 | Ould-Brahim | H04L 67/1065 |

OTHER PUBLICATIONS

C. Briat, et al., "The Conversation of Information, Towards an Axiomatized Modular Modeling Approach to Congestion Control", IEEE/ACM Transactions on Networking, vol. 23, No. 3, Jun. 2015, 15 pages.

C. Briat, et al., "Nonlinear state-dependent delay modeling and stability analysis of internet congestion control", 49th IEEE Conference on Decision and Control, Dec. 15-17, 2010, Hilton Atlanta Hotel, Atlanta, GA, USA, 8 pages.

D. Ros, et al., "Loss characterization in high-speed networks through simulation of fluid models", Telecommunication Systems, 16:1,2, 73-101, 2001, DOI: 10.1023/A:1009002828729, 29 pages.

* cited by examiner

| | |
|---|---|
| 601 | given the network parameters $c_l$ (link capacity), $d_l$ (link propagation delay), $d_l^{max}$ (maximum queue size) $F_l$ (set of flows sharing link l) for $l \in \{0, ... l-1\}$, $P_k$ (path of flow k) for $k \in \{1, ..., F\}$, and $\Delta t$ (sampling interval) |
| 602 | for each link $l \in \{0, ..., L-1\}$ do |
| 603 | if $l$ is an edge link |
| 604 | measure $f_k(I_l, t)$ for all $k \in F_l$ |
| 605 | Else |
| 606 | compute $f_k(I_l, t)$ for all $k \in F_l$ |
| 607 | find $prev(P_k, l)$ as the preceding link to link $l$ in $P_k$ |
| 608 | $f_k(I_l, t) = f_k(O_{prev(P_k, l)}, t - d_l)$ |
| 609 | compute the enqueued flows $f_k(E_l, t)$ for all $k \in F_l$ |
| 610 | $f_k(E_l, t) = \begin{cases} \frac{f_k(I_l, t)}{\Sigma_{k \in F_l} f_k(I_l, t)} c_l & \text{if } q_l(t) = q_l^{max} \text{ and } \sum_{k \in F_l} f_k(I_l, t) > c_l \\ f_k(I_l, t) & \text{otherwise} \end{cases}$ |
| 611 | compute the output flows $f_k(O_l, t)$ for all $k \in F_l$ |
| 612 | $f_k(O_l, t) = \begin{cases} \frac{f_k(I_l, t - \tau_l(t))}{\Sigma f_k(E_l, t - \tau_l(t))} c_l & \text{if } q_l(t) > 0 \text{ or } \sum_{k \in F_l} f_k(E_l, t) > c_l \\ f_k(E_l, t - \tau_l(t)) & \text{otherwise} \end{cases}$ |
| 613 | compute the dynamics of the queue length and backward delay |
| 614 | $\dot{q}_l(t) = \sum_{k \in F_l} f_k(E_l, t) - \sum_{k \in F_l} f_k(D_l, t)$ |
| 615 | $\dot{\tau}_l(t) = \frac{\dot{q}_l(t - \tau_l(t))}{\dot{q}_l(t - \tau_l(t)) + c_l}$ |
| 616 | update the queue length and backward delay |
| 617 | $q_l(t + \Delta t) = q_l(t + \Delta t) + \dot{q}_l(t) \Delta t$ |
| 618 | $\tau_l(t + \Delta t) = \tau_l(t + \Delta t) + \dot{\tau}_l(t) \Delta t$ |
| 619 | Update $t \leftarrow t + \Delta t$. Go to step 602 |

FIG.6

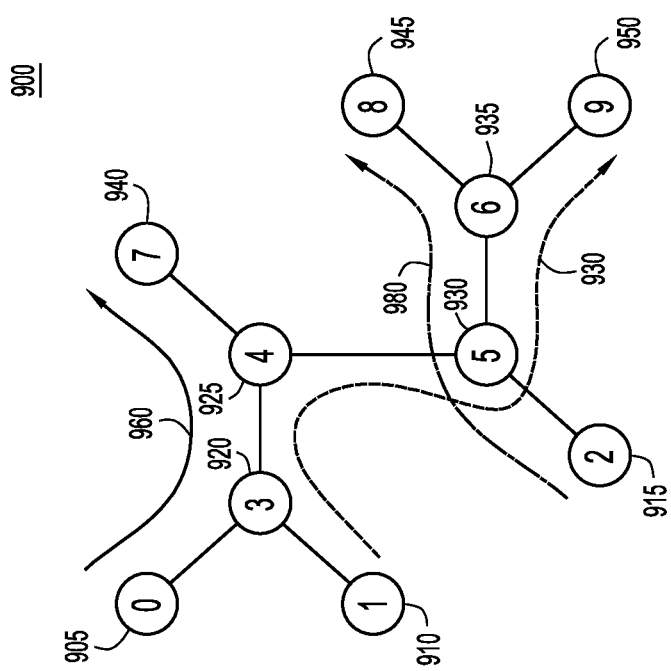
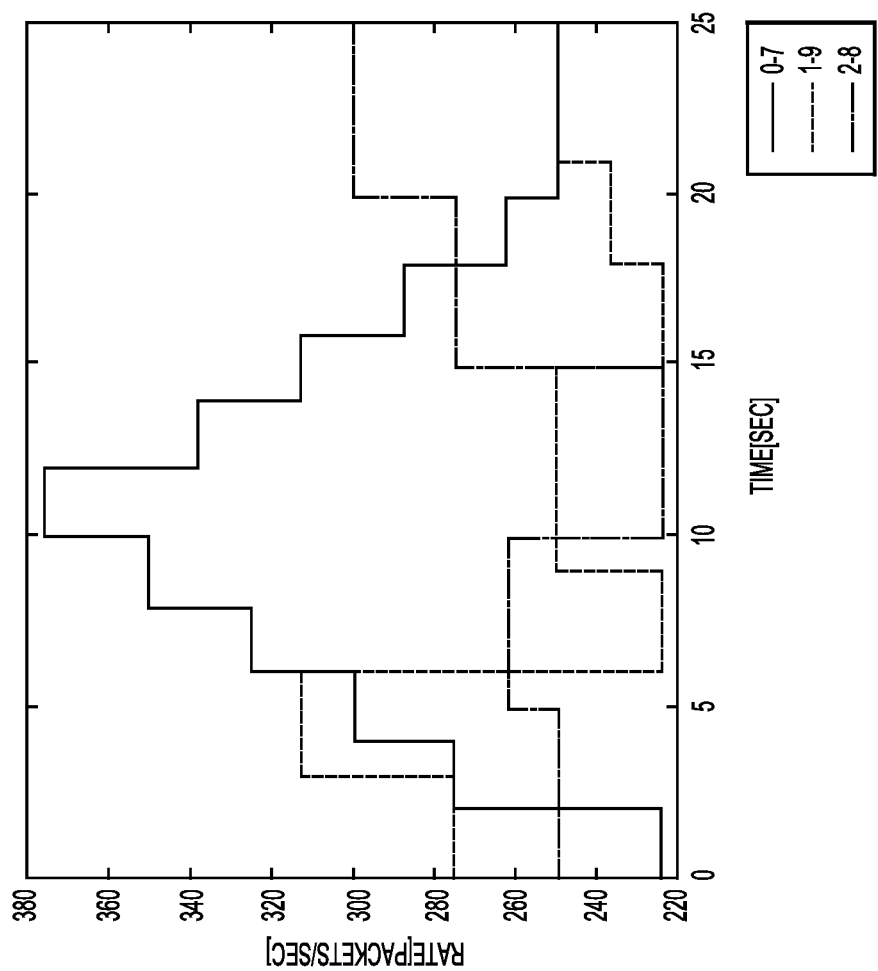
FIG.9A

NETWORK STATISTICS ESTIMATION AND PREDICTION

TECHNICAL FIELD

The present disclosure relates computer networks, including Software Defined Networks.

BACKGROUND

Estimating accurate real-time network state statistics on any network router/switch, enables network administrators to provide services to their users. Instances of such services include bounded delay for a specific path, bounded delay for specific applications, low jitter, zero-touch deployment in an enterprise fabric, dynamic centralized routing, congestion and loss prevention, and others.

Real-time network state statistics may be generated by polling each of the routers along the one or more flow paths being evaluated using, for example, Internet Control Message Protocol (ICMP) packets or other special probes. There is an inherent propagation and processing delay associated with every real-world network which prevents any system based on polling of every router being evaluated to be able to achieve statistics in true real-time. In other words, even if polling data could be polled from each router, it needs to be transmitted to a network controller, which takes a not insignificant amount of time. Hence, the data is observed at the network controller some meaningful time after the events that the data represents actually took place.

BRIEF DESCRIPTION OF THE DRAWINGS

FIG. 6 is a table containing pseudocode providing network statistics estimation and prediction, according to an example embodiment.

FIG. 9A is an illustration of a second network environment that was simulated to confirm the accuracy of the network statistics estimation and prediction techniques of the present disclosure, according to an example embodiment.

DESCRIPTION OF EXAMPLE EMBODIMENTS

Overview

A network computing device determines a network topology for at least one network flow path between at least one ingress network border device and at least one egress network border device. The network computing device receives a message containing data indicating flow statistics for the at least one ingress network border device. The network computing device generates flow statistics for at least one network device along the at least one network flow path from the network topology and the flow statistics for the at least one ingress network border device. The network computing device generates the flow statistics for at least one network device along the at least one network flow path without receiving flow statistics from the at least one network device along the at least one network flow path.

Example Embodiments

Figure 1:
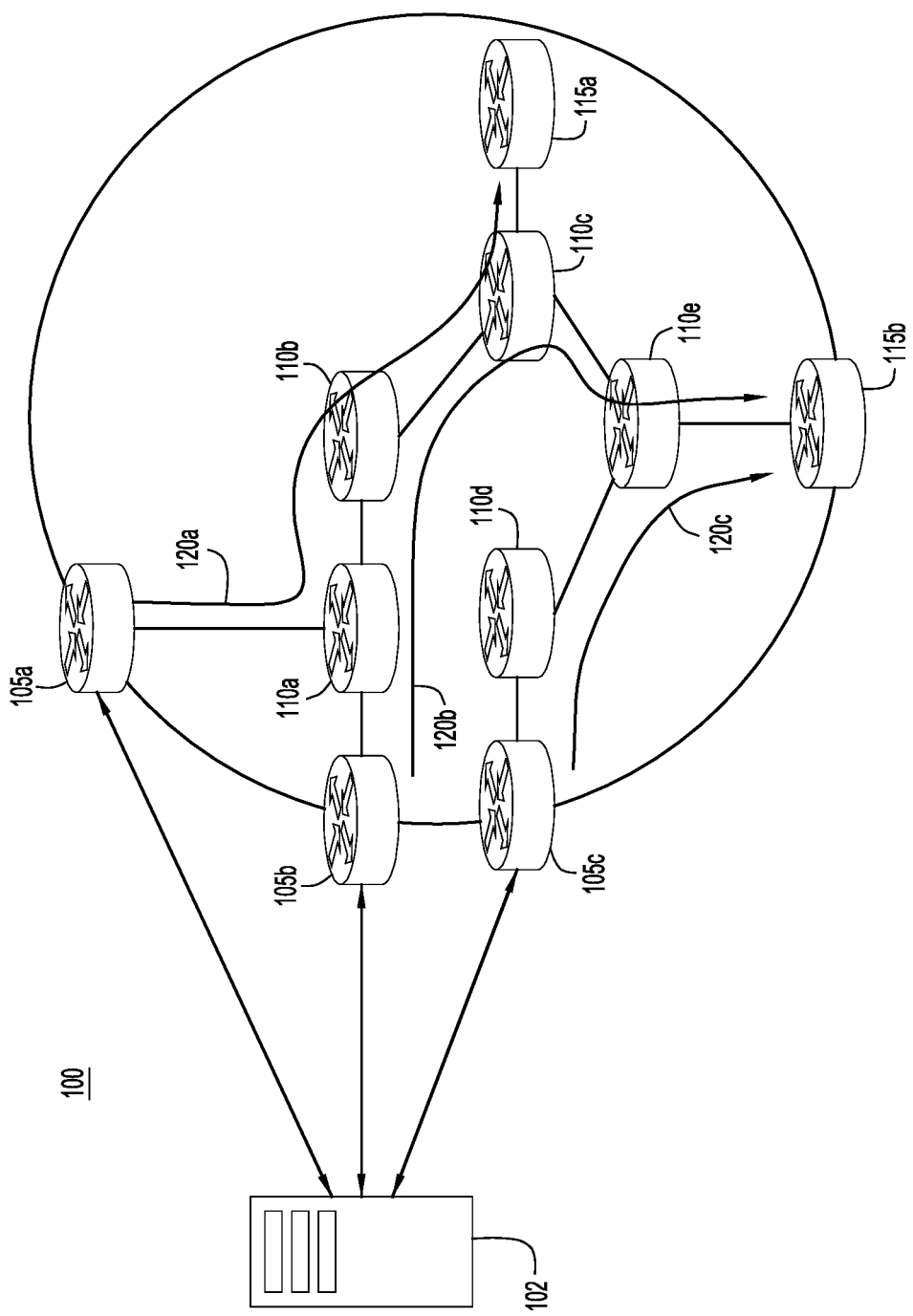
FIG. 1 is an illustration of an example network environment configured to provide network statistics estimation and prediction, according to an example embodiment.

With reference now made to FIG. 1, depicted therein is a network environment 100 configured to provide network statistics estimation and prediction, but does so in a way that may not require polling of all of the network devices within network environment 100. Specifically, included within network environment 100 is a network computing device 102 (which may be embodied as a Software Defined Networking (SDN) controller), ingress border network devices 105a-c (which in FIG. 1 are embodied as ingress border routers), network devices 110a-e (which in FIG. 1 are embodied as routers), and egress border network devices 115a and 115b (which in FIG. 1 are embodied as egress border routers). The network devices define three network flow paths through network environment 100, flow paths 120a-c. Flow path 120a includes ingress border router 105a, routers 110a-c and egress border router 115a. Flow path 120b includes ingress border router 105b, routers 110a-c and 110e, and egress border router 115b. Flow path 120c includes ingress border router 105c, border routers 110d and 110e, and egress border router 115b.

SDN controller 102 is configured to provide network statistics estimation and prediction via information provided by ingress border network devices (e.g., ingress border routers 105a-c) and may do so without polling the other network devices within network environment 100 (e.g., routers 110a-e and egress border routers 115a-c). As used herein, "polling" refers to the receipt of messages that communicate flow statistics for network devices. Accordingly, when it is stated that SDN controller 102 provides network statistics estimation and predictions without polling routers 110a-e and egress border routers 115a-c, it means that SDN controller 102 may provide network statistics estimation and predictions without receiving communications, either directly or indirectly, of flow statistics for routers 110a-e and egress border routers 115a-c. Instead, as will be explained below in greater detail, SDN controller 102 provides network statistics estimation and predictions based upon polling of ingress border routers 105a-c and network topology information for network environment 100. "Network topology information," as used herein, refers to the structure, capabilities and resources of network environment 100 and routers 105a-c, 110a-e and 115a and 115b, but this information may not include things such as current utilization of the capabilities of these elements. For example, network topology information may include a queue size for a particular router, but may not include the current amount of traffic within a particular queue. Similarly, network topology information may include the bandwidth for a particular link in network environment 100, but not the current bandwidth utilization. According to some specific example embodiments, the network topology information may include the link capacities, the maximum queue sizes, buffer descriptions, the link propagation delays, and the structure of the network for routers within a software defined network. The network topology information may be manually provided to SDN controller 112 by a user and/or automatically provided to SDN controller 112 through a system utilizing, for example, Cisco Systems' Application Policy Infrastructure Controller-Enterprise Module (APIC-EM), an XR Transport Controller (XTC), and/or a Border Gateway Protocol Link-State (BGP-LS) technology. The network topology information may also be dynamically updated.

As will be explain in detail below, SDN controller 102 may use the network topology information and the polling of ingress border routers 105a-c to provide network statistics estimation and predictions for some or all of the downstream network devices, such as routers 110a-e and egress border routers 115a and 115b. For example, through polling of ingress border routers 105a-c, SDN controller 102 may receive data indicating the current ingress flow rates to network environment 100. According some specific example embodiments, the polling of the ingress border routers 115a and 115b may utilize Cisco's® Netflow technology to receive the current ingress flow rates through the ingress border routers 115a and 115b. This polling may also indicate the current queue utilization of ingress border routers 105a-c and/or the outflow or dequeue rate for ingress border routers 105a-c. On the other hand, SDN controller 102 may calculate the current queue utilization of ingress border routers 105a-c and/or the outflow or dequeue rate for ingress border routers 105a-c based upon the network topology information and the current ingress flow rates to network environment 100. Based upon the dequeue rates from ingress border routers 105a-c and the network topology information, SDN controller 102 may calculate the ingress flow rates to routers 110a and 110d. From the ingress flow rates to routers 110a and 110d, SDN controller 102 may calculate the queuing rate and dequeuing rates for routers 110a and 110d. These dequeuing rates may then be used by SDN controller 102 to calculate the in-flow rates to routers 110b and 110e, respectively. This process may continue, calculating statistics for devices along the flow paths, until SDN controller 102 has calculated the in-flow, queuing and dequeuing rates for egress border routers 115a and 115b.

As noted above, the network topology information may be dynamically updated. If such an update is made while network statistics estimations are being performed, the estimation process may continue using the prior topology information, or the estimation process may restart at ingress border routers 115 a and 115b using the newly updated topology information.

As will also be explained below in further detail, the network statistics estimation and predictions may be performed by using a fluid model in which the routers are modeled as dynamically changing resistors. Such a technique enables accurate estimation and forward prediction of network state, which enables network policy changes in real time. Such modelling techniques are capable of capturing almost any phenomena in networks, such as drop policies in routers, queuing strategies, multiple queues in a router, traffic class separation, and others.

Furthermore, the techniques described herein (i.e., providing network statistics estimation and predictions through modelling that may be accomplished with polling of only the ingress border network devices) provide benefits over conventional techniques. For example, some conventional techniques that provide network state statistics require aggressive polling of more than just the ingress border routers using, for example, Internet Control Message Protocol (ICMP) packets or other special probes. Such polling is itself problematic as it requires additional messages, additional network traffic, and may not reliably return the correct and current data. Even if the polled data could be successfully gathered, correlating it with the problems in the network and making network configuration and policy changes is challenging in a timely manner relevant to application performance or quality service level objectives. Additionally, there is an inherent propagation and processing delay associated with every real-world network, which prevents any system based on polling of downstream devices to be able to achieve the desired statistics in real-time. In other words, even if this data could be polled from each router, it needs to be transmitted to, for example, a SDN controller, which takes a measurable amount of time, $\Delta t$. Therefore, the data is observed at the SDN controller $\Delta t$ time after it actually happened. It is difficult and sometimes impossible to shrink this $\Delta t$ to zero or an otherwise sufficiently small value to consider the data as being received in "real-time." As a result, any system based on network polling may not actually be real-time. As a corollary, if gathering full or partial network state in a timely manner has not proven to be viable, then prediction of such statistics is also not practical to achieve with active polling. Example embodiments of the techniques described herein may solve some or all of the above-described problems encountered in traditional network statistics estimation and prediction techniques.

Figure 2:
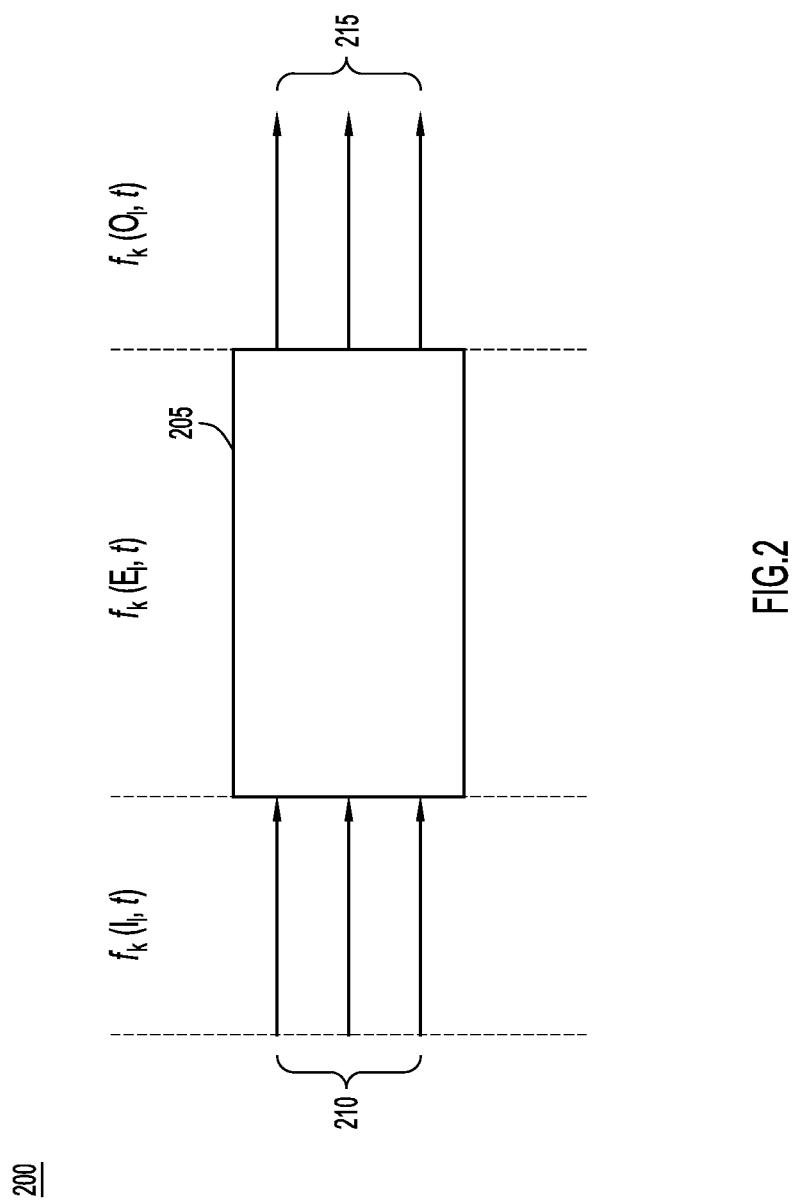
FIG. 2 is an illustration of a single network device used to show how the network statistics estimation and prediction techniques of the present disclosure are applied to a single network device, according to an example embodiment.

With reference now made to FIG. 2, depicted therein is a simplified network environment 200 that will be used to illustrate the concepts used in the statistics estimation and prediction techniques described herein. The discussion below illustrates how an inflow rate to a particular network device and known parameters about the particular network device may be used to calculate the enqueuing rate and outflow rate for that same device.

Specifically, network environment 200 includes a single network device (e.g., a router) 205 with an incoming traffic flow 210 and an outgoing traffic flow 215. Incoming traffic flow 210 may be understood to vary as a function of time, meaning the input flow rate will change over time. As illustrated in FIG. 2, $f_k(I_l, t)$ is the input flow rate (e.g., in packets per second) for a flow k using a link l at time t. Router 205 will have an enqueuing rate $f_k(E_l, t)$, which is the rate (e.g., packets per second) at which router 205 may enqueue packets for flow f over link l at time t. The enqueuing rate for router 205 may differ from the input flow rate based on the capabilities of a particular router. For example, a particular router may have a maximum enqueue rate, or capacity $c_l$, that is less than the inflow rate, resulting in dropped packets. The outgoing flow rate for router 205 is $f_k(O_l, t)$, which is the rate (e.g., packets per second) at which router 205 may output packets for flow f over link at time t. Some example embodiments of the techniques described herein may assume that the dequeuing rate $f_k(D_l,t)$ for router 205 is the same as the outflow rate $f_k(O_l, t)$ for router 205. On the other hand, the enqueuing rate $f_k(E_l, t)$ and the outflow rate $f_k(O_l, t)$ are not necessarily equal, since the flow experiences a queuing delay from $E_l$ to $D_l$, and the output capacity of the queue is shared proportionally across multiple flows in case of congestion.

The techniques described herein are also concerned with a length of the queue for router 205, which is denoted here as $q_l(t)$. The maximum queue size for router 205 is denoted as $q_l^{max}$. According to the techniques described herein, the length of the queue, $q_l(t)$ is determined when the incoming flows, $f_k(I_l, t)$ $k \in F_l$, are given. With the above definitions, the queue length changes according to the following integrator model:

$$\dot{q}_l(t) = \sum_{k \in F_l} f_k(E_l, t) - \sum_{k \in F_l} f_k(D_l, t) \quad (1)$$

In other words, the rate of change of the queue length at time t is equal to the difference between the sum of the dequeued or outgoing flows at time t ($\Sigma_{k \in F_l} f_k(D_l, t)$ or $\Sigma_{k \in F_l} f_k(O_l,t)$) and the sum of the enqueued flows at the same time ($\Sigma_{k \in F_l} f_k(E_l, t)$). In order to calculate the queue length $q_l(t)$, the enqueued and dequeued (i.e., outgoing flows) are calculated.

In drop-tail policy, the queue of router 205 drops packets whenever it becomes full. When the queue is full, it is dequeuing packets at a rate equal to the capacity of the link, $c_l$. Therefore, the enqueuing capacity is also equal to the capacity of the link. If the queue is full and the sum of the incoming flows exceeds this capacity, the excessive packets are dropped. More precisely, the enqueuing rate may be defined as follows:

$$f_k(E_l, t) = \begin{cases} \dfrac{f_k(I_l, t)}{\sum_{k \in F_l} f_k(I_l, t)} c_l & \text{if } q_l(t) = q_l^{max} \text{ and} \\ & \sum_{k \in F_l} f_k(I_l, t) > c_l \\ f_k(I_l, t) & \text{otherwise} \end{cases} \quad (2)$$

Eq. (2) models an example embodiment in which when the queue is in dropping condition, the available enqueuing capacity ($c_1$) is shared proportionally across the incoming flows (fair enqueuing). The amount of flow that gets dropped is equal to $f_k(I_l, t) - f_k(E_l, t)$ which, based on Eq. (2), is equal to:

$$f_k^{dropped}(E_l, t) = \begin{cases} \left(1 - \dfrac{c_l}{\sum_{k \in F_l} f_k(I_l, t)}\right) f_k(I_l, t) & \text{if } q_l(t) = q_l^{max} \text{ and} \\ & \sum_{k \in F_l} f_k(I_l, t) > c_l \\ 0 & \text{otherwise} \end{cases} \quad (3)$$

The above equation asserts that flows are also dropped proportionally based on their relative rates (fair dropping). With the enqueuing rate calculated, the dequeuing or outflow rate at time t, $f_k(O_l, t)$, may be calculated.

In order to calculate the dequeuing or outflow rate, the delay experienced from $E_l$ to $O_l$ is denoted as $\tau_l(t) \geq 0$. In other words, the input time of the dequeued flow $f_k(O_l, t)$ at time t is equal to $t - \tau_l(t)$. Notice that this backward delay depends implicitly on the queue length $q_l(t)$ and hence, is a time-varying quantity. In particular, $\tau_l(t) = 0$ if and only if $q_l(t) = 0$. The dequeing process may be described by the following equation:

$$f_k(O_l, t) = \begin{cases} \dfrac{f_k(E_l, t - \tau_l(t))}{\sum f_k(E_l, t - \tau_l(t))} c_l & \text{if } q_l(t) > 0 \text{ or} \\ & \sum f_k(E_l, t) > c_l \\ f_k(E_l, t - \tau_l(t)) & \text{otherwise} \end{cases} \quad (4)$$

The rate at which the flows are dequeued depends on the state of the queue. If at time t the queue is congested, the dequeuing rate will be equal to the capacity of the link. The queue is congested when the queue is not empty or the sum of the enqueued flows exceeds the capacity of the link. In either case, the capacity of the link is proportionally assigned to the dequeued flows. If the queue is empty and the sum of the enqueued flows does not exceed the capacity of the link, all the flows will be dequeued at the same rate they were enqueued.

Next, the backward queuing delay $\tau_l(t)$ may be calculated. By definition, $\tau_l(t)$ is the experienced delay when the dequeue time is t. In other words, any flow that is dequeued at time t was enqueued at time $t - \tau_l(t)$. For a single queue, $\tau_l(t)$ satisfies the following equation:

$$\frac{q_l(t = \tau_l(t))}{c_l} = \tau_l(t) \quad (5)$$

Computing the delay from the implicit equation above may not be feasible for large-scale networks in real-time. However, the changes in $\tau_l(t)$ may be tracked by using a differential equation and the knowledge of the initial value. Taking the time-derivative of the above equation results in the following:

$$(1 - \dot{\tau}_l(t)) \frac{\dot{q}_l(t - \tau_l(t))}{c_l} = \dot{\tau}_l(t). \quad (6)$$

By rearranging the terms, the dynamics of the backward delay for router l at time t equals:

$$\dot{\tau}_l(t) = \frac{\dot{q}_l(t - \tau_l(t))}{\dot{q}_l(t - \tau_l(t)) + c_l}. \quad (7)$$

The above equation asserts that the dynamics of the backward delay depends on the delayed dynamics of the queue length. The above dynamics are singular if $\dot{q}_l(t-\tau_l(t))=-c_l$. This condition occurs when the input flows of the queue at time $t-\tau_l(t)$ are all zero. Suppose that $\dot{q}_l(t-\tau_l(t))=-c_l$ for the time interval $[t-\tau_l(t), t-\tau_l(t)+T]$ where $0 \le T \le \tau_l(t)$ is the duration of time for which the input flows were zero. The first packet that arrives at time $t-\tau_l(t)+T$ will leave the queue at time t, implying that the backward delay incurs a discontinuous jump from $\tau_l(t)$ to $\tau_l(t)-T$. This concept will now be illustrated with reference to FIG. 3.

Figure 3:
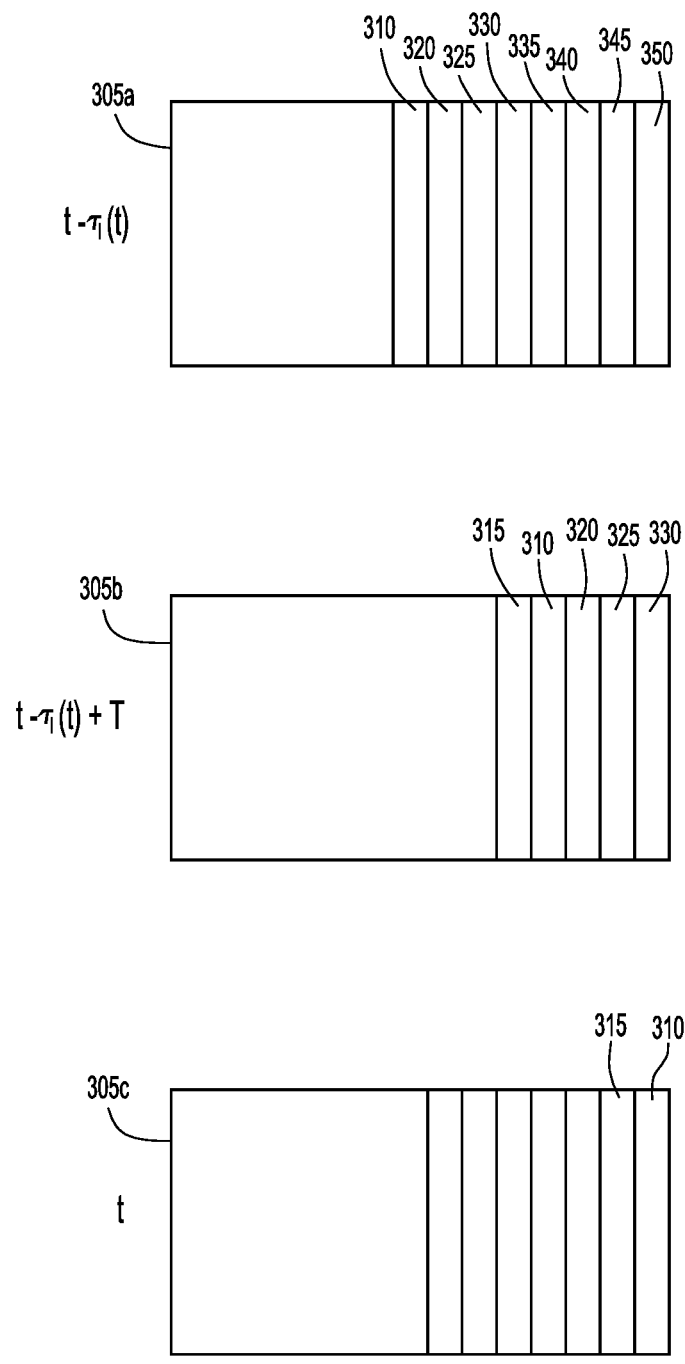
FIG. 3 is a conceptual illustration of a network device queue used to illustrate the network statistics estimation and prediction techniques of the present disclosure, according to an example embodiment.

Illustrated in FIG. 3 is a queue 305 at three times. Queue 305a is the queue at a time $t-\tau_l(t)$. This is the time at which packet 310 is received at the queue. Queue 305b is the queue at a time $t-\tau_l(t)+T$. This is time at which a subsequent packet 315 is received at the queue. Queue 305c is the queue at a time t. This is the time at which both packets 310 and 315 are dequeued from queue 305c. Accordingly, packet 310 has a backward delay of TKO and packet 315 has a backward delay of $\tau_l(t)-T$. In other words, packet 315 experiences a smaller backward delay than packet 310 because queue 305b is smaller than queue 305a. As illustrated in FIG. 3, there are seven packets, packets 320, 325, 330, 335 340, 345 and 350, ahead of packet 310 in queue 305a, but only four packets, packets 310, 320, 325 and 330, ahead of packet 315 in queue 305b. In other words, there is a discontinuous jump in backwards delay for packets as a result of the dynamic nature of the queue size.

Accordingly, if the inflow rate $f_k(I_l, t)$ to a particular device (e.g., a router) and its properties, such as its queue size, are known, then the enqueuing rate $f_k(E_l, t)$ may be determined from equation (2), the packet dropped rate $f_k^{dropped}(E_l, t)$ may be determined form equation (3), and the dequeuing or outflow rate may be determined from equations (4)-(7).

Figure 4:
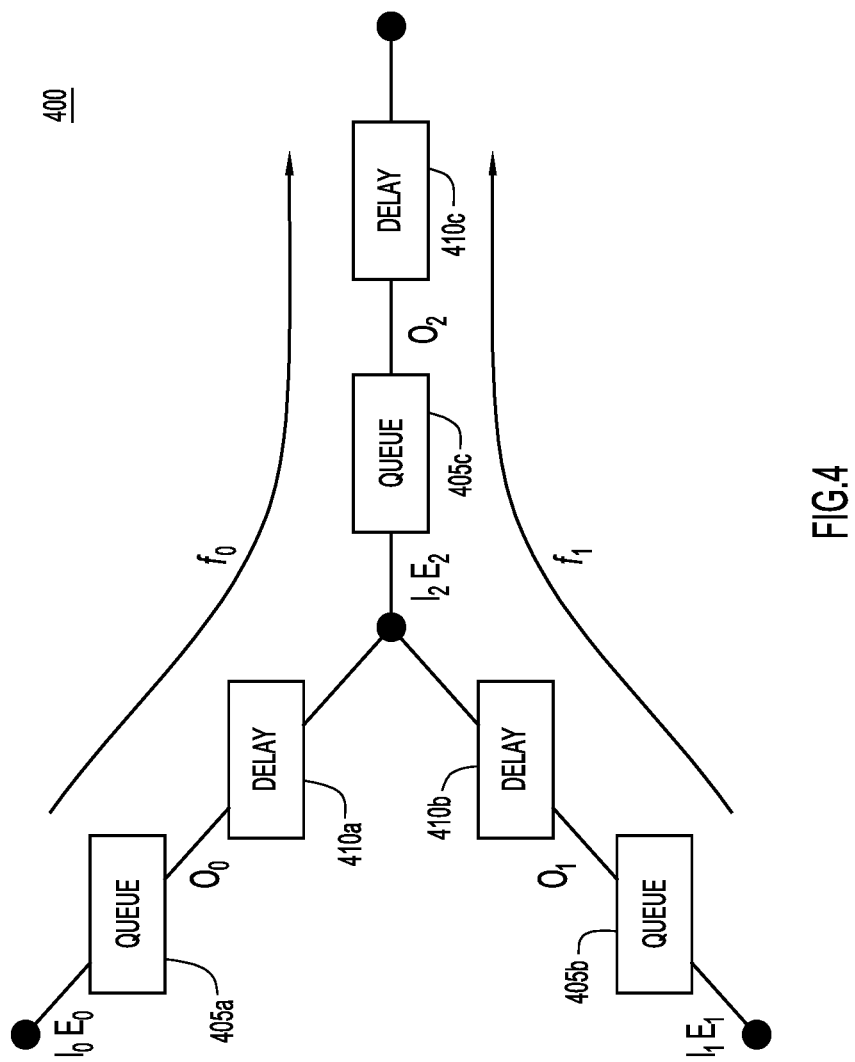
FIG. 4 is a conceptual illustration of three network links used to illustrate the network statistics estimation and prediction techniques of the present disclosure, according to an example embodiment.

With reference now made to FIG. 4, depicted therein is a detail of a network environment 400 that is used to illustrated how the concepts described above regarding the single queue of FIG. 2 may be expanded to be used in a multi-device (and therefore multi-queue) network environment like that of FIG. 1. As shown in FIG. 4, it may be incorrect to assume that the outflow of one queue, such as queues 405a and 405b may be easily summed to use as the inflow rate to queue 405c for a particular time t. This is because, as illustrated, each link includes a respective propagation delay 410a-c.

One challenge associated with determining network device queues is determining an accurate delay that each flow experiences in its path until it arrives at a specific node at time t. Absent such an accurate determination, it may be difficult to determine the inflow rate to a particular node. Specifically, as described above, the outflow rate of a particular node is a time dependent value as illustrated through Eq. (4). Accordingly, to accurately determine an inflow rate to a node from the outflow rate of the preceding node, the propagation delay may be considered to capture the time dependent changes to the outflow rate of the previous node. The challenge in calculating the propagation delay is illustrated with reference to FIG. 5.

Figure 5:
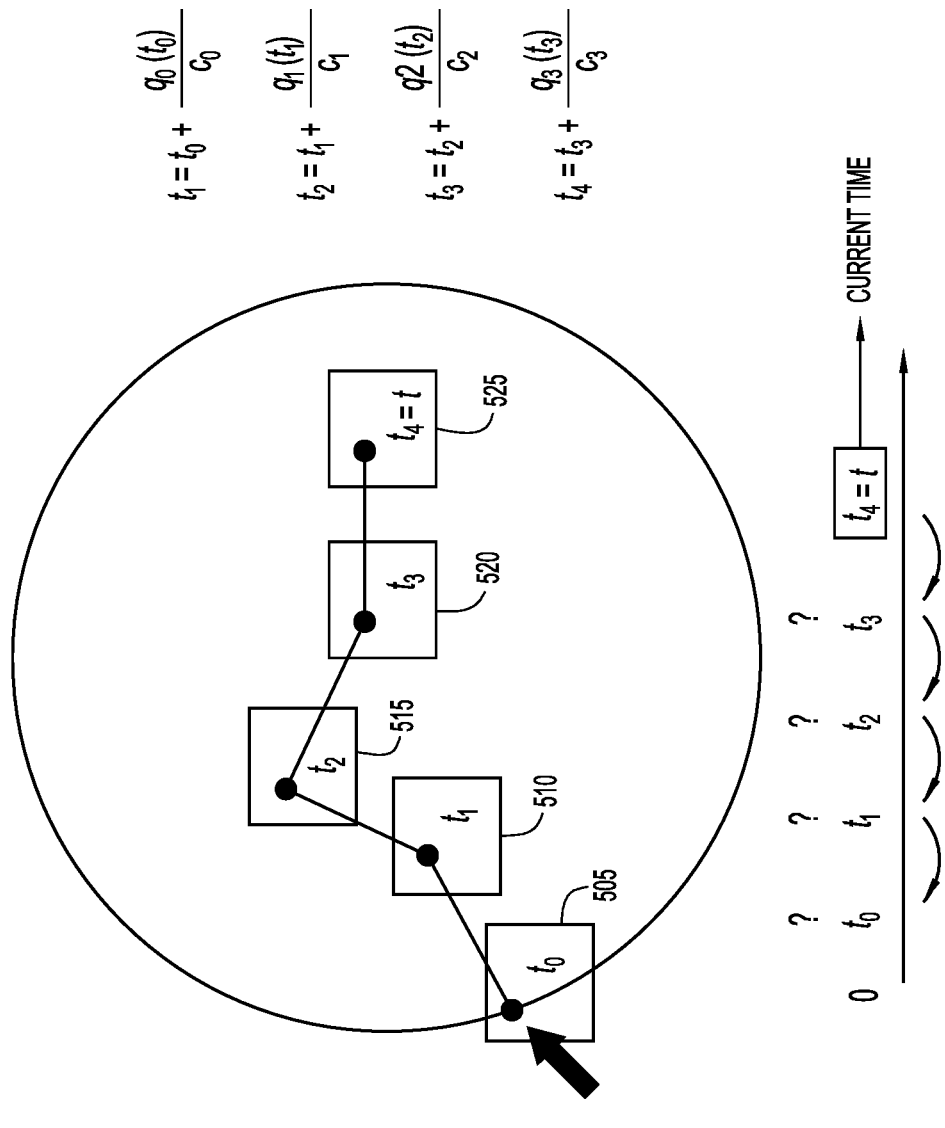
FIG. 5 is a conceptual illustration of five network nodes used to illustrate the network statistics estimation and prediction techniques of the present disclosure, according to an example embodiment.

Illustrated in FIG. 5 are five network nodes, nodes 505, 510, 515, 520 and 525. As a packet enters the network environment 500, it will arrive at node 505 at time $t_0$, at node 510 at time $t_1$ at node 515 at time $t_2$, at node 520 at time $t_3$, and node 525 at time $t_4$. One possible simplification is to assume the delay the flow experienced at each node is the same as the delay of that node at the time when the flow arrives at the egress node, in this case node 525. This may not be a correct assumption because the dynamic resistance of routers change over time as a function of the flows that pass through them. In other words, the delay that a specific flow has seen in, for example, node 515 at time $t_2$ is different from the delay that another flow experiences in node 515 at time $t_4$. As a result, the dynamic resistance (or propagation delay) of each of nodes 505-525 may be tracked over time. By tracking the dynamic resistance over time, it may be possible to calculate the correct statistics for each flow at each node in the network.

Returning to FIG. 4, the links in the network environment 400 are shared by F traffic flows. Each flow $f_i \in \{f_1, \ldots, f_F\}$ utilizes a specified path of links connecting a source node to a destination node. For clarity, only two flows are illustrated in network environment 400, flows $f_0$ and $f_1$. Flow $f_0$ includes the links indicated by delays 410a and 410c, while flow $f_1$ includes the links illustrated by delays 410b and 410c. The input flow to queue 405c is equal to the delayed output of queues 405a and 450b. More specifically, the flows that enter queue 405c may be defined as follows:

$$f_0(I_2,t)=f_0(O_o,t-d_0)$$

$$f_1(I_2,t)=f_0(O_1,t-d_1)$$

The values $d_0$ and $d_1$ are constant values that are predetermined by the nature of the devices that comprise the respective network links. As noted above, Eq. (8) states that the input flows of each link (except for the edge links where the input flows are measured and/or polled) are the delayed output of the output flows of the preceding links. This implies that in order to update the states of any link at the current time t, output flows of the preceding links in the past are a parameter that may be used in the calculations.

Accordingly, as illustrated through the discussion above, if the inflow rate $f_k(I_l, t)$ to a particular device (e.g., a router) and its properties, such as its queue size, are known, then the enqueuing rate $f_k(E_l, t)$ may be determined from equation (2), the packet dropped rate $f_k^{dropped}(E_l, t)$ may be determined form equation (3), and the dequeuing or outflow rate may be determined from equations (4)-(7). Similarly, if the outflow and delay of a particular link are known, then the inflow rate to the subsequent links may be calculated using equation (8). Accordingly, so long as the inflow rates to the ingress network devices, the link capacities $c_l$, the maximum queue sizes $q_l$, the link propagation delays $d_l$, and the structure of the network are known, statistics for each of the downstream network nodes may be calculated. For example, with reference once again made to FIG. 1, if the above described techniques are applied to network environment 100 it may been seen how the inflow rate, enqueing rate, dropped rate and dequeuing or outflow rate may be calculated for each of routers 110a-e and border egress routers 115a and 115b.

Specifically, ingress routers 150a-c are polled by SDN controller 102 to determine their inflow rates and current queue sizes. Using the polled data and network topology information that includes the link capacities $c_l$, the maximum queue sizes $q_l$ and link propagation delays $d_l$, SDN controller 102 may calculate the enqueuing rates, dropped rates and outflow rates for ingress border routers 105a-c. According to other example embodiments, the polling of ingress border routers 105a-c may include data indicative of the enqueuing rates, dropped rates and outflow rates for ingress border routers 105a-c. The outflow rates from ingress border routers 105a and 105b are used to calculate the inflow rates for router 110a through, for example, equation (8) above. Once the inflow rate for router 110a is calculated, the SDN controller 102 may calculate the enqueuing rates, dropped rates and outflow rates for router 110*a* using equations (2)-(7), above. SDN controller 102 may then use the outflow rates for router 110*a* to compute the enqueuing rates, dropped rates and outflow rates for router 110*b*. This process will continue through network environment 100, allowing SDN controller 102 to calculate the enqueuing rates, dropped rates and outflow rates for routers 110*c-e* and egress border routers 115*a* and 115*b*.

Network computing device 102 may also calculate additional statistics based upon the above described calculations for the devices contained in network environment 100. For example, network computing device 102 may also calculate one or more of the following statistics:

1. Queue lengths per router per traffic class
2. Queueing delays for each path
3. End-to-end delay within the network
4. Delay from any node in the network to another
5. Jitter estimation per path
6. Packet loss estimation per router per traffic class
7. Bandwidth utilization per router per traffic class Some of the above-noted statistics will be calculated using statistics previously calculated for two or more network devices along a flow path or within a software defined network. For example, end-to-end delay within the network may require calculations using statistics previously calculated for a plurality of network devices within the network. Queuing delays for a path, jitter estimation per path and delay from one node to another may similarly require the use of statistics previously calculated for a plurality if network devices along a path or within a software defined network.

Turning now to FIG. 6, presented therein is pseudo code for performing the above-described processes. In operation 601 of pseudocode 600, the initial parameters for the subsequent calculations are entered. In other words, the network topology, including the flow paths, the link capacities $c_l$, the maximum queue sizes $q_l$ and the link propagation delays $d_l$, are entered. Using the network environment 100 from FIG. 1 as an example, the network topology information is received by the SDN controller 102. In operations 602-608 the inflow rate is determined for all of the network devices being evaluated. The evaluation of network devices are performed in a "downstream" direction. Using FIG. 1 as an example, first the ingress border routers 105*a-c* are evaluated. Then downstream routers 110*a-e* evaluated in an order that ensures are all upstream routers are evaluated prior to any downstream routers. For example, the order of evaluation will ensure that both of routers 110*c* and 110*d* are evaluated before router 110*e*, as the calculations performed for routers 110*c* and 110*d* are necessary to evaluate router 110*d*.

If the network device being evaluated is an ingress border device (e.g., ingress border routers 105*a-c* of FIG. 1), steps 603 and 604 will measure or poll the inflow rates to the device. If the network device being evaluated is a device downstream from the ingress border devices (e.g., routers 105*a-c* and/or egress routers 115*a-b* of FIG. 1), Eq. (8) above is used to calculated the inflow rate to the device. In operations 609 and 610, Eq. (2) is used to calculate the enqueuing rate for each of the devices in the network environment, and in operations 611 and 612, Eq. (4) is used to calculate the outflow rates for the devices in the network environment. In operations 613-615, Eqs. (1) and (7) are used to dynamically calculate the queue lengths and the backward delays, respectively. In operations 616-618, the queue lengths and backward delays are updated with the dynamically calculated values. Finally, in operation 619, the process returns to operation 602 to repeat the process for the next time interval. As described above with reference to FIGS. 1-5, the processing of network nodes/devices proceeds in a downstream direction, meaning the outputs for any upstream nodes/devices are calculated first to be used as inputs for the downstream nodes/devices.

Figure 7:
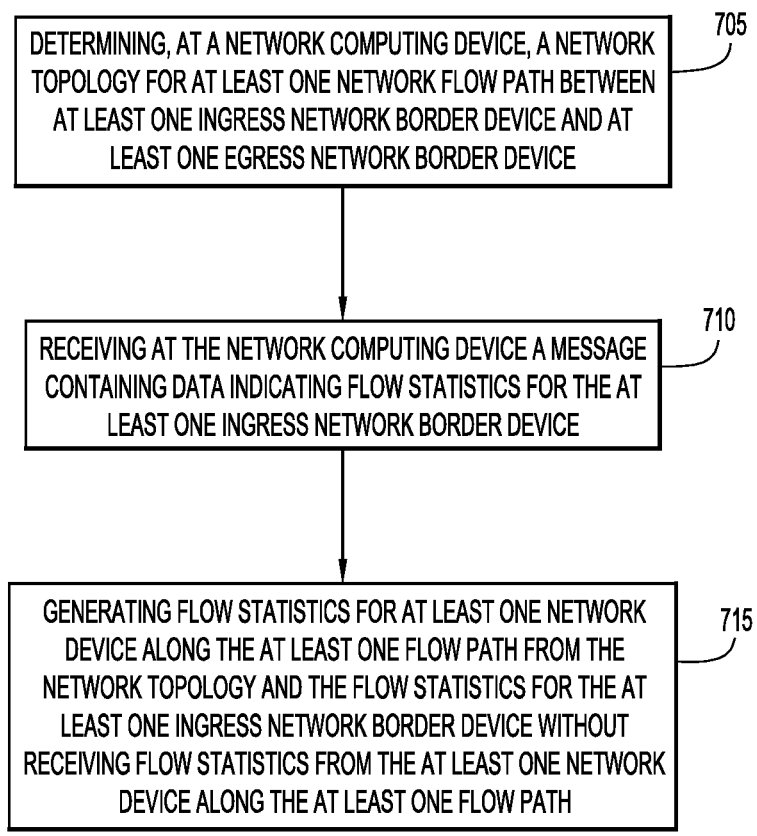
FIG. 7 is a flowchart illustrating a process for providing network statistics estimation and prediction, according to an example embodiment.

With reference now made to FIG. 7, depicted therein is a flowchart 700 illustrating a process for performing the network statistics estimation and prediction as described herein. The process begins in operation 705 in which a network computing device determines a network topology for at least one network flow path between at least one ingress network border device and at least one egress network border device. For example, operation 705 may include a network computing device, such as a SDN controller receiving network topology information. This information may include the network flow paths, the link capacities for the links along the flow paths, the maximum queue sizes of the network device along the flow paths, and link propagation delays for the links along the flow paths.

In operation 710, the network computing device receives a message containing flow statistics for the at least one ingress network border device. For example, the network computing device may receive one or more messages that indicates the inflow rates to one or more ingress border routers. The flow statistics may also include other information, such as the enqueuing rate for the one more ingress border routers and/or the outflow rate for the one or more border routers. The network computing device may also calculate the enqueuing rate for the one more ingress border routers and/or the outflow rate for the one or more border routers from the received flow statistics and the network topology information. For example, the network computing device may utilize Eqs. (2)-(7) above to calculate the enqueuing rate for the one more ingress border routers and/or the outflow rate for the one or more border routers from the received flow statistics and the network topology information.

In operation 715, the network computing device generates flow statistics for at least one network device along the at least one network flow path from the network topology information and the flow statistics for the at least one ingress network border device. The network computing device calculates the flow statistics for the at least one network device along the at least one network flow path without receiving flow statistics from the at least one network device along the at least one network flow path. For example, the network computing device may use Eq. (8) to calculate the inflow rate to the at least one network device along the at least one network flow path. The network computing device may also use Eqs. (2)-(7) above to calculate the enqueuing rate for the at least one network device along the at least one network flow path and/or the outflow rate for the at least one network device along the at least one network flow path from the received flow statistics and the network topology information. The network computing device may also calculate further statistics, such as queue lengths per router per traffic class, queueing delays for each path, end-to-end delay within the network environment, delay from any node in the network to another, jitter estimation per path, packet loss estimation per router per traffic class, and/or bandwidth utilization per router per traffic class, among others.

The techniques provided for herein not only provide for the above described statistics in an efficient way, but the results of the statistics generation are generally as accurate as those generated by related-art techniques. As will now be described with reference to FIGS. 8A-B, 9A-B and 10A-B, the predictive power of the techniques described herein compare favorably with statistics generated by, for example, the open source packet-based discrete-event simulator known in the art as Network Simulator 3, or "NS3."

Figure 8A:
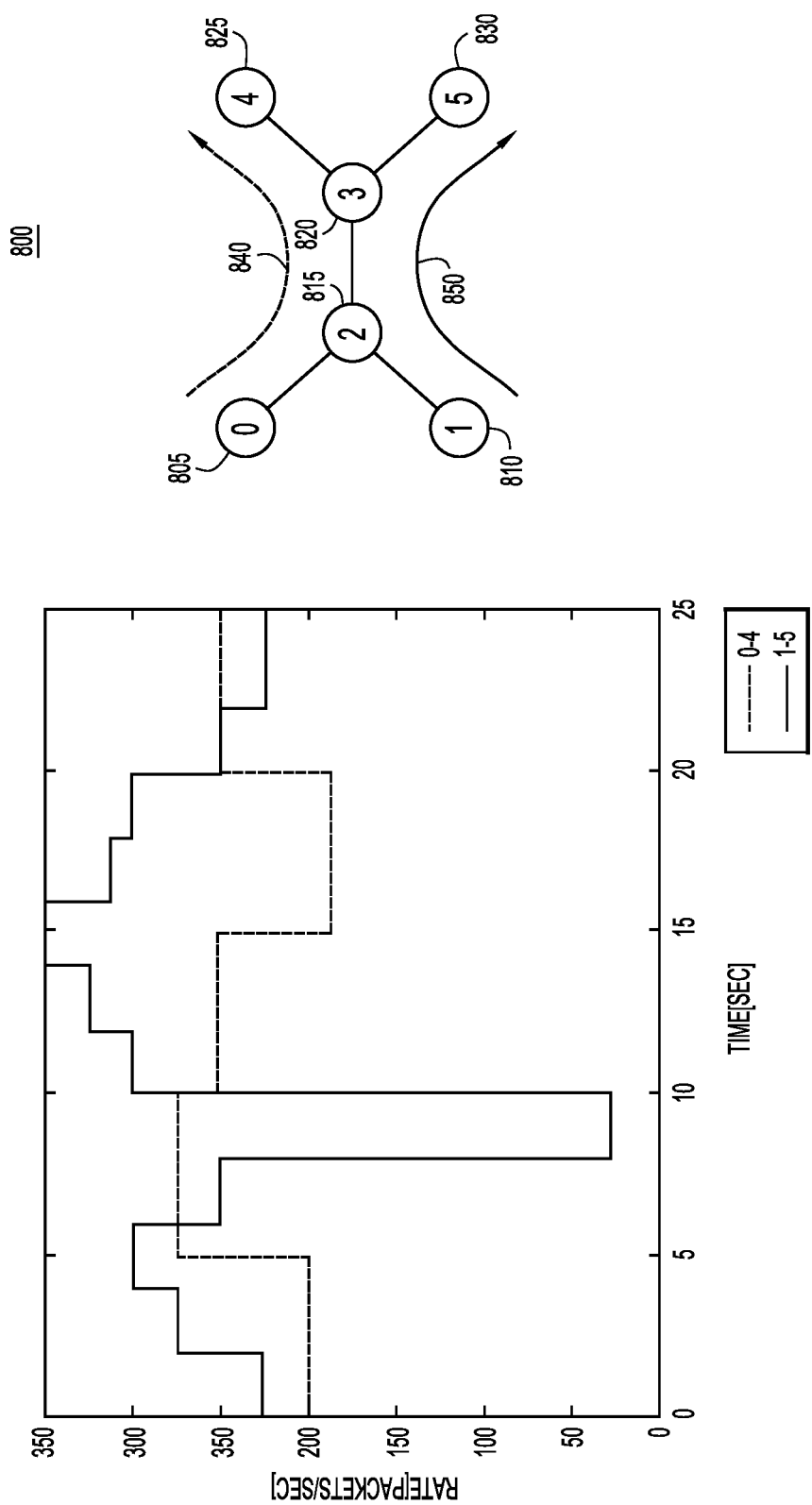
FIG. 8A is an illustration of a first network environment that was simulated to confirm the accuracy of the network statistics estimation and prediction techniques of the present disclosure, according to an example embodiment.

Illustrated in FIG. 8A is dumbbell network 800 with nodes 805 and 810 being ingress border routers (where the ingress traffic is sampled), routers 815 and 820 being routers shared by flow paths 840 and 850, and egress border routers 825 and 830 serving as the egress points for flow paths 840 and 850, respectively. The parameters of network 800 are given in Table 1, below. The packet size is assumed to be 1000 bytes and the sampling interval is $\Delta t=0.1$ sec (equivalent to sampling frequency of 10 Hz).

TABLE 1

Parameters of the dumbbell network depicted in FIG. 8A.

| Link | Bandwidth (bit/sec) | Delay (msec) | Queue Size (Packets) |
|---|---|---|---|
| 805 to 815 | 2,000,000 | 10 | 800 |
| 810 to 815 | 2,000,000 | 20 | 900 |
| 815 to 820 | 3,000,000 | 30 | 1000 |
| 820 to 825 | 1,000,000 | 40 | 900 |
| 825 to 830 | 1,000,000 | 50 | 700 |

Figure 8B:
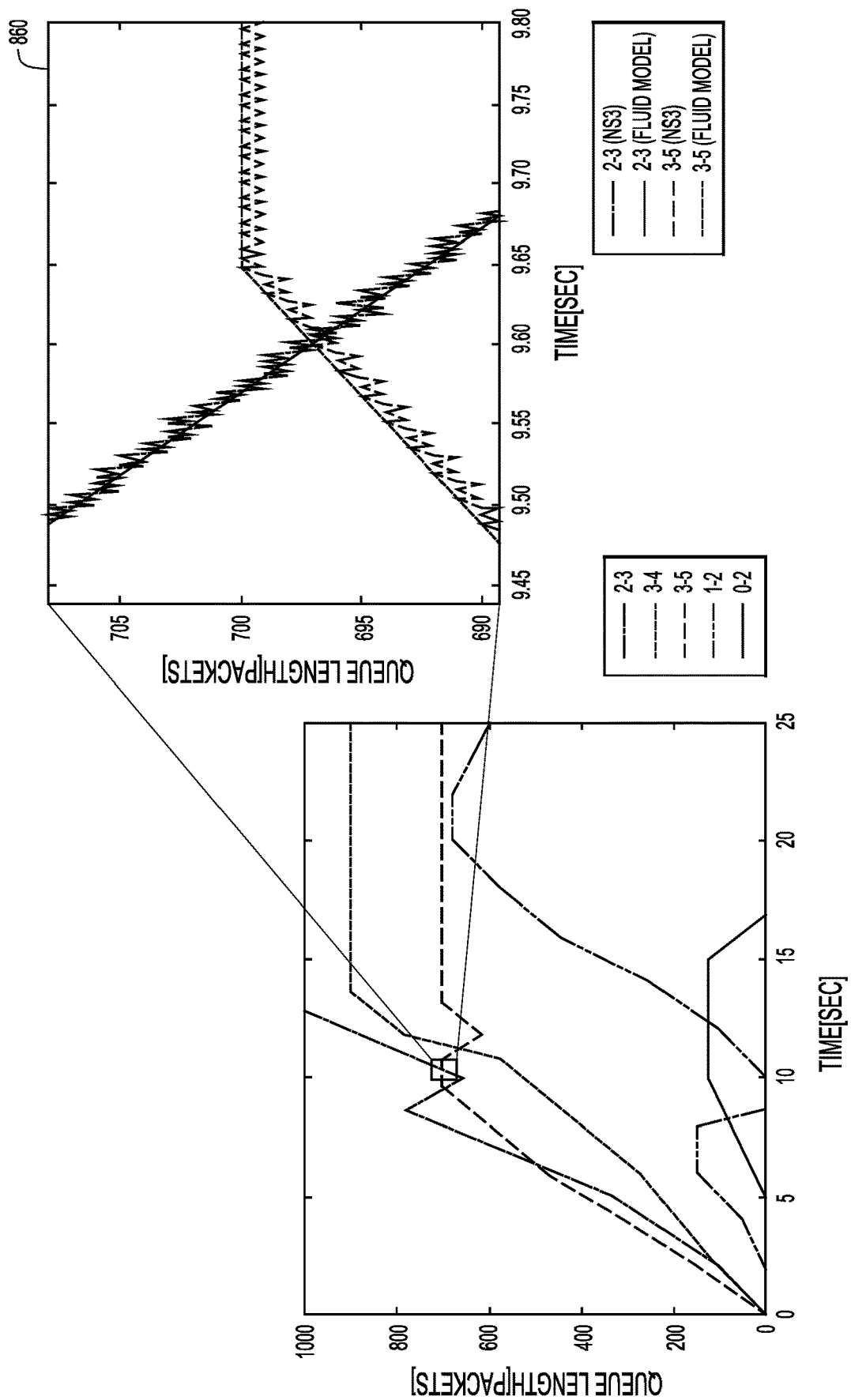
FIG. 8B is a graph illustrating the results of a first simulation of the network statistics estimation and prediction techniques of the present disclosure, according to an example embodiment.

FIG. 8B plots the queue lengths against time. As observed in the expanded portion 860, the techniques described herein stably fit to the results of packet simulator NS3. Notice, however, that using the fluid model described herein to reduce the computational complexity results in the output essentially averaging out packet level fluctuations due to enqueuing and dequeuing. In other words, the techniques described herein are capable of finding the essential information of the queue lengths of each queue over time, without providing extraneous detail regarding exact packet-level statistics.

Figure 9B:
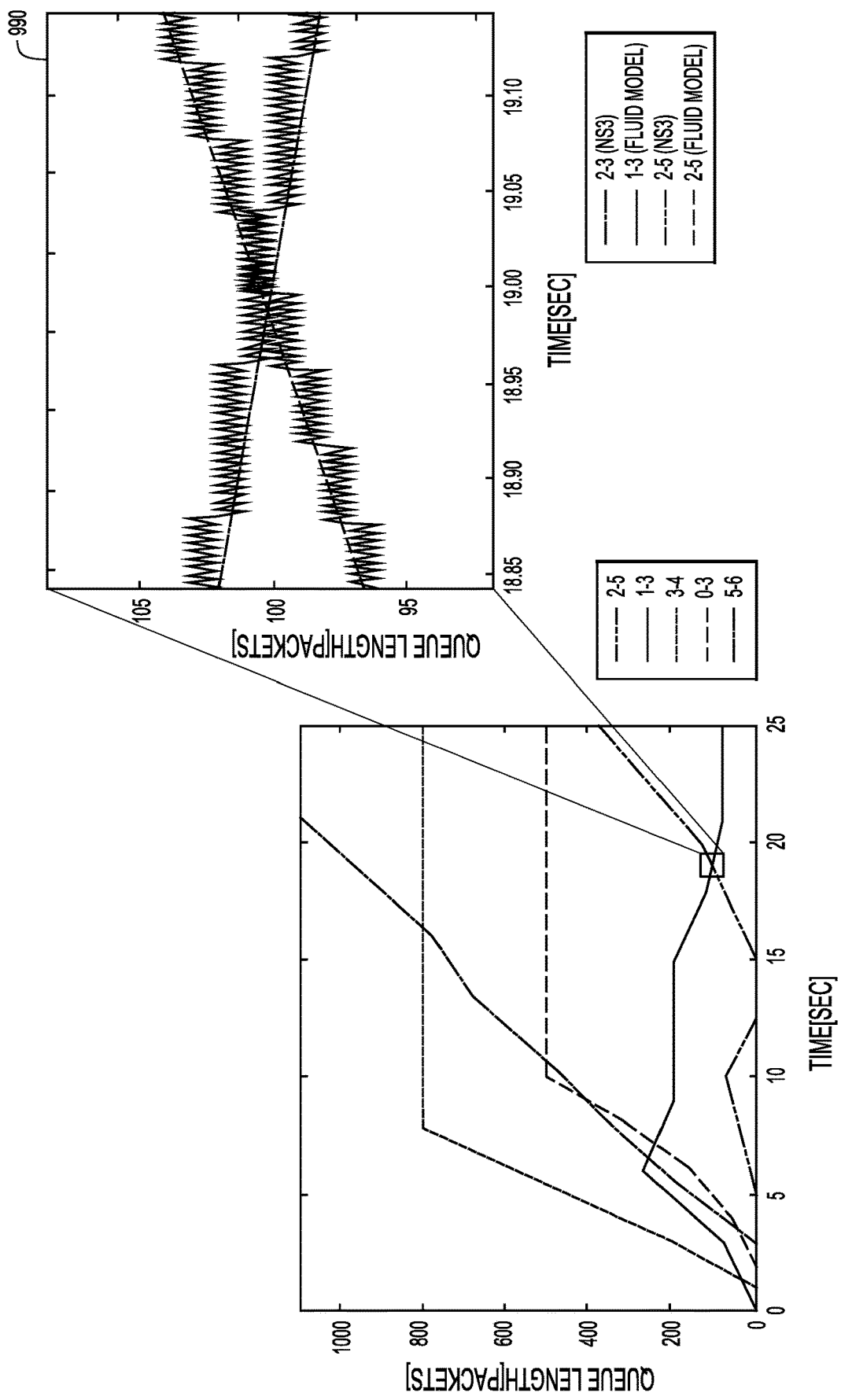
FIG. 9B is a graph illustrating the results of a second simulation of the network statistics estimation and prediction techniques of the present disclosure, according to an example embodiment.

The simulation illustrated in FIGS. 9A and 9B presents a more complex network environment that includes 10 nodes and 9 links. The ingress border routers 905, 910 and 915 route the ingress traffic to egress border routers 940, 950 and 945, respectively. The parameters of network 900 are given in Table 2, below.

TABLE 2

Parameters of the network depicted in FIG. 9A.

| Link | Bandwidth (bit/sec) | Delay (msec) | Queue Size (Packets) |
|---|---|---|---|
| 905 to 920 | 2,000,000 | 1000 | 500 |
| 910 to 920 | 2,000,000 | 1000 | 600 |
| 920 to 925 | 2,000,000 | 1000 | 700 |
| 925 to 940 | 2,000,000 | 1000 | 800 |
| 925 to 930 | 3,000,000 | 1000 | 900 |
| 915 to 930 | 2,000,000 | 1000 | 1000 |
| 930 to 935 | 3,000,000 | 1000 | 1100 |
| 935 to 945 | 2,000,000 | 1000 | 1200 |
| 935 to 950 | 2,000,000 | 1000 | 1300 |

For this scenario, the NS3 simulation creates a stream of more than 160000 events, while the techniques described herein generate only 6750 events (for a 25 second simulation) while maintaining similar levels of usable, accurate data as illustrated in enlarged portion 960. Furthermore, the techniques described herein have the ability to change the frequency of updates to achieve different resolutions based upon user need.

Figure 10A:
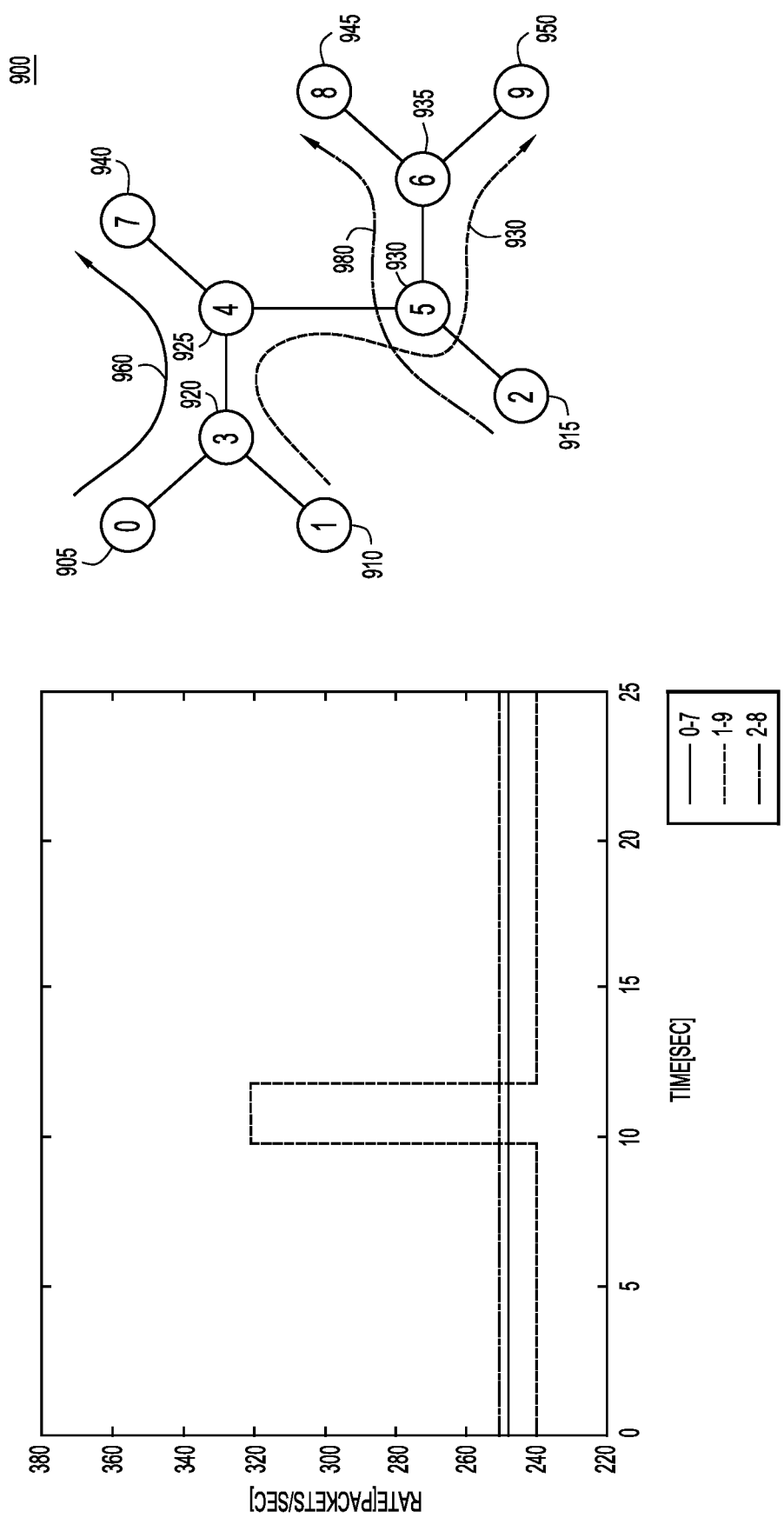
FIG. 10A is an illustration of a third network environment that was simulated to confirm the accuracy of the network statistics estimation and prediction techniques of the present disclosure, according to an example embodiment.
Figure 10B:
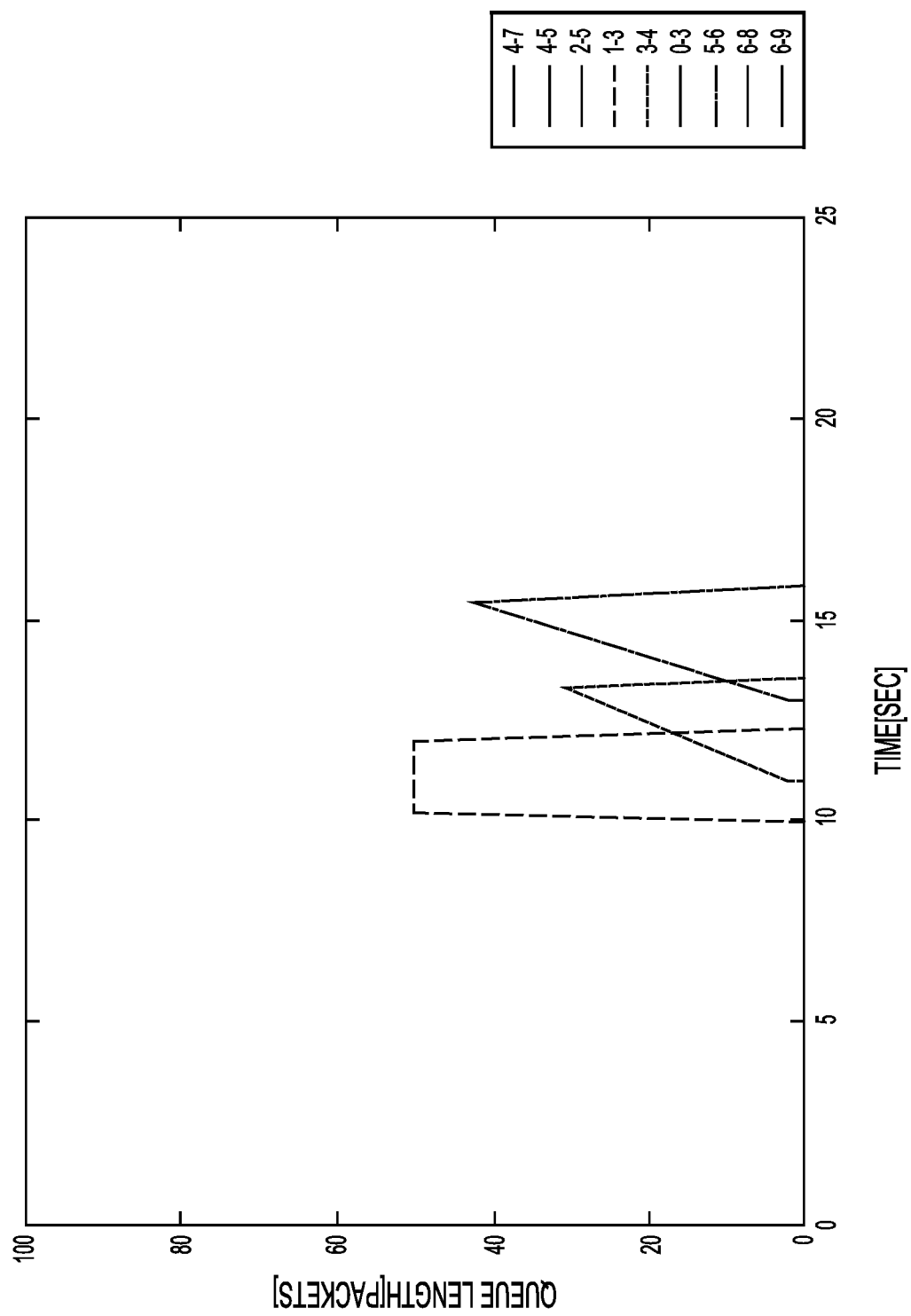
FIG. 10B is a graph illustrating the results of a third simulation of the network statistics estimation and prediction techniques of the present disclosure, according to an example embodiment.

FIG. 10A also illustrates network environment 900, but simulates the effect of a transient burst of traffic on the network. The parameters of this simulation are included below in Table 3. Initially, all the flows are stable and then, a 2-second burst of traffic propagates from node 910 destined for node 950. The results of the simulation are depicted in FIG. 10B with each of the links from nodes 910 to 920, node 920 to 925, and nodes 930 to 935 showing transient bursts which when combined last for 6 seconds. Accordingly, the techniques described herein successfully simulate transient effects as well as the more "steady state" effects illustrated in FIGS. 8A-B and 9A-B.

TABLE 3

Parameters of the network depicted in FIG. 10A.

| Link | Bandwidth (bit/sec) | Delay (msec) | Queue Size (Packets) |
|---|---|---|---|
| 905 to 920 | 2,000,000 | 1000 | 50 |
| 910 to 920 | 2,000,000 | 1000 | 50 |
| 920 to 925 | 2,000,000 | 1000 | 50 |
| 925 to 940 | 2,000,000 | 1000 | 50 |
| 925 to 930 | 3,000,000 | 1000 | 50 |
| 915 to 930 | 2,000,000 | 1000 | 50 |
| 930 to 935 | 3,000,000 | 1000 | 50 |
| 935 to 945 | 2,000,000 | 1000 | 50 |
| 935 to 950 | 2,000,000 | 1000 | 50 |

Figure 11:
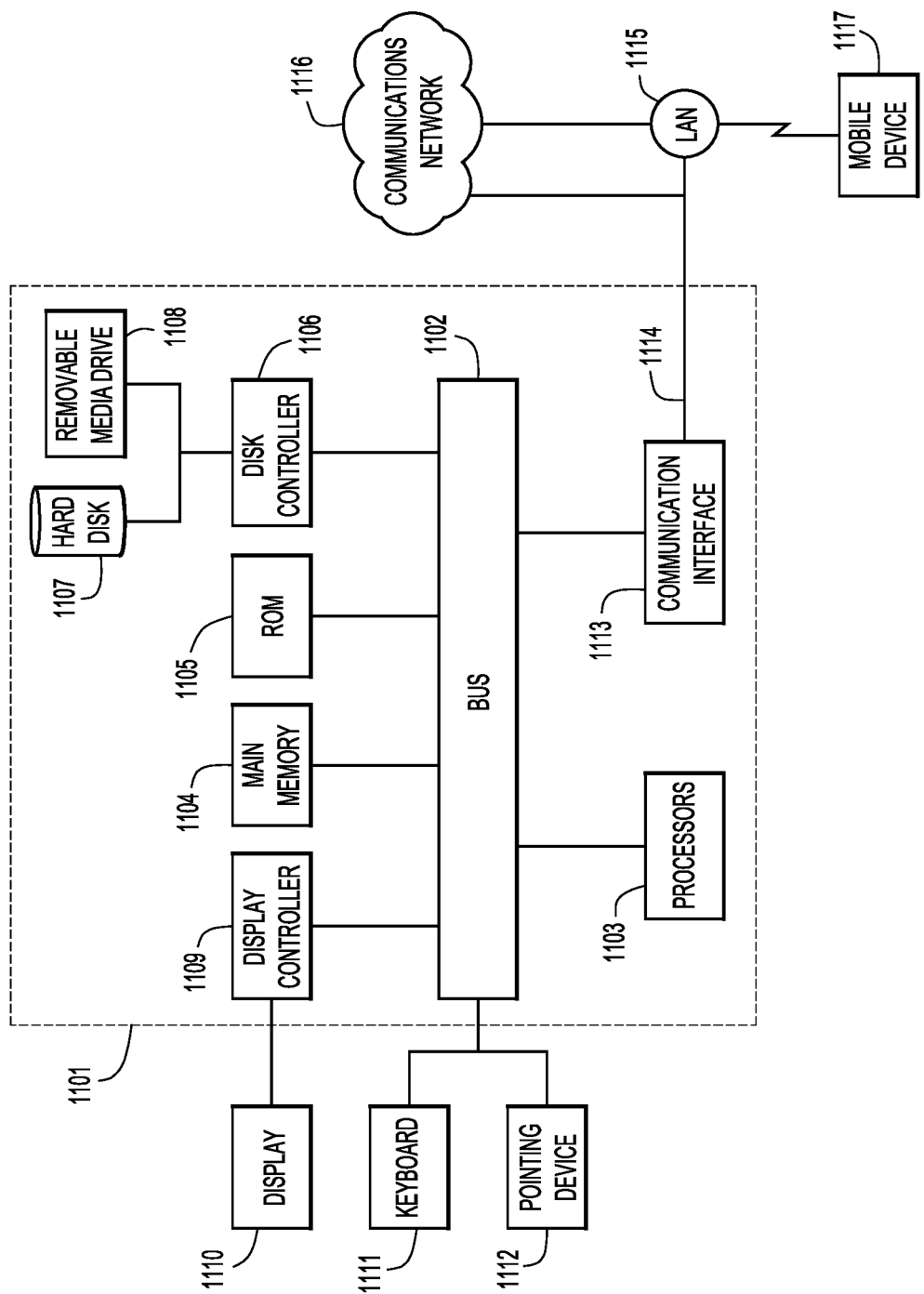
FIG. 11 is a block diagram illustration of a device configured to implement the network statistics estimation and prediction techniques of the present disclosure, according to an example embodiment.

With reference now made to FIG. 11, illustrated therein is a computer system 1101 upon which the embodiments presented may be implemented. The computer system 1101 may be programmed to implement the operations described herein that are performed by a network computing device. For example, the computer system 1101 may be programmed to function as a SDN controller The computer system 1101 includes a bus 1102 or other communication mechanism for communicating information, and a processor 1103 coupled with the bus 1102 for processing the information. While the figure shows a single block 1103 for a processor, it should be understood that the processors 1103 represent a plurality of processing cores, each of which can perform separate processing. The computer system 1101 also includes a main memory 1104, such as a random access memory (RAM) or other dynamic storage device (e.g., dynamic RAM (DRAM), static RAM (SRAM), and synchronous DRAM (SD RAM)), coupled to the bus 1102 for storing information and instructions to be executed by processor 1103. In addition, the main memory 1104 may be used for storing temporary variables or other intermediate information during the execution of instructions by the processor 1103.

The computer system 1101 further includes a read only memory (ROM) 1105 or other static storage device (e.g., programmable ROM (PROM), erasable PROM (EPROM), and electrically erasable PROM (EEPROM)) coupled to the bus 1102 for storing static information and instructions for the processor 1103.

The computer system 1101 also includes a disk controller 1106 coupled to the bus 1102 to control one or more storage devices for storing information and instructions, such as a magnetic hard disk 1107, and a removable media drive 1108 (e.g., floppy disk drive, read-only compact disc drive, read/write compact disc drive, compact disc jukebox, tape drive, and removable magneto-optical drive). The storage devices may be added to the computer system 1101 using an appropriate device interface (e.g., small computer system interface (SCSI), integrated device electronics (IDE), enhanced-IDE (E-IDE), direct memory access (DMA), or ultra-DMA).

The computer system 1101 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1101 may also include a display controller 1109 coupled to the bus 1102 to control a display 1110, such as a cathode ray tube (CRT), Liquid Crystal Display (LCD) or other now known or hereinafter developed display technologies, for displaying information to a computer user. The computer system 1101 includes input devices, such as a keyboard 1111 and a pointing device 1112, for interacting with a computer user and providing information to the processor 1103. The pointing device 1112, for example, may be a mouse, a trackball, or a pointing stick for communicating direction information and command selections to the processor 1103 and for controlling cursor movement on the display 1110. In addition, a printer may provide printed listings of data stored and/or generated by the computer system 1101.

The computer system 1101 performs a portion or all of the processing steps of the process in response to the processor 1103 executing one or more sequences of one or more instructions contained in a memory, such as the main memory 1104. Such instructions may be read into the main memory 1104 from another computer readable medium, such as a hard disk 1107 or a removable media drive 1108. One or more processors in a multi-processing arrangement may also be employed to execute the sequences of instructions contained in main memory 1104. In alternative embodiments, hard-wired circuitry may be used in place of or in combination with software instructions. Thus, embodiments are not limited to any specific combination of hardware circuitry and software.

As stated above, the computer system 1101 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1101, for driving a device or devices for implementing the process, and for enabling the computer system 1101 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1101 also includes a communication interface 1113 coupled to the bus 1102. The communication interface 1113 provides a two-way data communication coupling to a network link 1114 that is connected to, for example, a local area network (LAN) 1115, or to another communications network 1116 such as the Internet. For example, the communication interface 1113 may be a wired or wireless network interface card to attach to any packet switched (wired or wireless) LAN. As another example, the communication interface 1113 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1113 sends and receives electrical, electromagnetic or optical signals that carry digital data streams representing various types of information.

The network link 1114 typically provides data communication through one or more networks to other data devices. For example, the network link 1114 may provide a connection to another computer through a local area network 1115 (e.g., a LAN) or through equipment operated by a service provider, which provides communication services through a communications network 1116. The local network 1114 and the communications network 1116 use, for example, electrical, electromagnetic, or optical signals that carry digital data streams, and the associated physical layer (e.g., CAT 5 cable, coaxial cable, optical fiber, etc.). The signals through the various networks and the signals on the network link 1114 and through the communication interface 1113, which carry the digital data to and from the computer system 1101 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1101 can transmit and receive data, including program code, through the network(s) 1115 and 1116, the network link 1114 and the communication interface 1113. Moreover, the network link 1114 may provide a connection through a LAN 1115 to a mobile device 1117 such as a personal digital assistant (PDA) laptop computer, or cellular telephone.

In summary, provided for herein are techniques to use sampled information from only the border routers to estimate and predict fine-grain statistics of all downstream interior routers in the network path using a fluid model. The techniques described herein model the routers as dynamically changing resistors, which enables accurate estimation and forward prediction of network state. These accurate predictions enable network policy changes in real time. Furthermore, the techniques described herein are capable of capturing almost any phenomena in networks, such as drop policies in routers, queueing strategies, multiple queues in a router, traffic class separation, and others.

In one form, a method is provided comprising: determining, at a network computing device, a network topology for at least one network flow path between at least one ingress network border device and at least one egress network border device; receiving at the network computing device a message containing data indicating flow statistics for the at least one ingress network border device; and generating flow statistics for at least one network device along the at least one network flow path from the network topology and the flow statistics for the at least one ingress network border device without receiving flow statistics from the at least one network device along the at least one network flow path.

This method may also be embodied in non-transitory computer readable storage media that are encoded with instructions which, when executed by one or more processors, cause the one or more processors to perform the above-described methods.

In still another form, an apparatus is provided comprising: a network interface configured to communicate over a network; and one or more processors configured to: determine a network topology for at least one network flow path between at least one ingress network border device and at least one egress network border device; receive, via the network interface, a message containing data indicating flow statistics for the at least one ingress network border device; and generate flow statistics for at least one network device along the at least one network flow path from the network topology and the flow statistics for the at least one ingress network border device without receiving flow statistics from the at least one network device along the at least one network flow path.

Benefits that the techniques described herein may provide may include:

1. Providing fine-grain statistics of the network paths from the imperfect information gathered at the network border routers through the use of modelling the router queues as resistors and the traffic flows as fluids.
2. Estimating/predicting accurate delay/jitter between any two nodes in the network without polling the routers in the middle.
3. Providing a predictive and real-time estimation power that gives an SDN controller the power of proactive actuation, while other methods based on polling the routers can only hypothetically reach near real-time estimation, that are at best reactive.
4. Utilizing a number of polls to internal routers that is drastically reduced (or even zero) compared to alternative solutions based on active polling and probing. The internal routers are not polled unless a change in the network is reported (e.g., a link failure, etc.) and a correction is required, therefore, the number of polls is zero unless there is a change, which is often rare in a campus network.
5. Compared to discrete-event packet-based simulators (e.g., NS3), tracking orders of magnitude fewer states, while providing similar, if not better, predictions regarding network behavior.
6. Facilitating deployment on top of SDN controllers, while such deployment may not be feasible for a packet-level simulator such as NS3 or an active probing system that polls the internal routers.
7. Exploiting information from NetFlow or other existing network flow capturing frameworks, which is not usable by a packet-level estimator/simulator.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   determining, at a network computing device, a network topology for at least one network flow path between at least one ingress network border device and at least one egress network border device;
   receiving at the network computing device a message containing data indicating flow statistics for the at least one ingress network border device;
   generating flow statistics specific to a first network device arranged between the at least one ingress network border device and the at least one egress network border device along the at least one network flow path from the network topology and the flow statistics for the at least one ingress network border device without receiving flow statistics from network devices downstream from the ingress network border device along the at least one network flow path and without receiving flow statistics from the egress network border device; and
   generating flow statistics specific to a second network device downstream from the first network device from the flow statistics generated specific to the first network device and from the network topology.

2. The method of claim 1, wherein the second network device is the at least one egress network border device.

3. The method of claim 1, wherein generating the flow statistics specific to the first network device along the at least one network flow path comprises generating one or more of a queue length, a queue delay, a packet loss estimation, or a bandwidth utilization estimation.

4. The method of claim 1, wherein generating the flow statistics specific to the first network device along the at least one network flow path comprises:
   determining an input flow to the first network device along the at least one network flow path;
   computing an enqueuing rate of the first network device along the at least one network flow path; and
   determining an output flow of a queue of the first network device along the at least one network flow path.

5. The method of claim 1, further comprising generating one or more of a jitter estimation or an end-to-end delay for the at least one network flow path based upon the flow statistics for the at least one ingress network border device and the flow statistics for the first network device along the at least one network flow path.

6. The method of claim 1, wherein generating the flow statistics specific to the first network device along the at least one network flow path comprises generating the flow statistics specific to the first network device from flow statistics for a plurality of ingress network border devices.

7. The method of claim 1, wherein generating the flow statistics specific to the first network device along the at least one network flow path comprises generating flow statistics specific to a plurality of network devices along a plurality of flow paths.

8. The method of claim 1, wherein the network topology includes information indicating a link propagation delay for at least one link in the at least one network flow path.

9. The method of claim 1, wherein the network topology includes information indicating a maximum queue size for the first network device along the at least one network flow path.

10. An apparatus comprising:
a network interface configured to communicate over a network; and
one or more processors configured to:
determine a network topology for at least one network flow path between at least one ingress network border device and at least one egress network border device;
receive, via the network interface, a message containing data indicating flow statistics for the at least one ingress network border device;
generate flow statistics specific to a first network device along the at least one network flow path arranged between the at least one ingress network border device and the at least one egress network border device from the network topology and the flow statistics for the at least one ingress network border device without receiving flow statistics from network devices downstream from the ingress network border device along the at least one network flow path and without receiving flow statistics from the egress network border device; and
generate flow statistics specific to a second network device downstream from the first network device from the flow statistics generated specific to the first network device and from the network topology.

11. The apparatus of claim 10, wherein the second network device is the at least one egress network border device.

12. The apparatus of claim 10, wherein the one or more processors are configured to generate the flow statistics specific to the first network device along the at least one network flow path by generating one or more of a queue length, a queue delay, a packet loss estimation, or a bandwidth utilization estimation.

13. The apparatus of claim 10, wherein the one or more processors are configured generate the flow statistics specific to the first network device along the at least one network flow path by:
determining an input flow to the first network device along the at least one network flow path;
computing an enqueuing rate of the first network device along the at least one network flow path; and
determining an output flow of a queue of the first network device along the at least one network flow path.

14. The apparatus of claim 10, wherein the one or more processors are configured to generate the flow statistics specific to the first network device along the at least one network flow path by generating the flow statistics specific to the first network device from flow statistics for a plurality of ingress network border devices.

15. The apparatus of claim 10, wherein the one or more processors are configured to generate the flow statistics specific to the first network device along the at least one network flow path by generating flow statistics specific to a plurality of network devices along a plurality of flow paths.

16. A tangible, non-transitory computer readable storage medium encoded with instructions, wherein the instructions, when executed, are operable to:
determine, at a network computing device, a network topology for at least one network flow path between at least one ingress network border device and at least one egress network border device;
receive at the network computing device a message containing data indicating flow statistics for the at least one ingress network border device;
generate flow statistics specific to a first network device along the at least one network flow path arranged between the at least one ingress network border device and the at least one egress network border device from the network topology and the flow statistics for the at least one ingress network border device without receiving flow statistics from network devices downstream from the ingress network border device along the at least one network flow path and without receiving flow statistics from the egress network border device; and
generate flow statistics specific to a second network device downstream from the first network device from the flow statistics generated specific to the first network device and from the network topology.

17. The tangible, non-transitory computer readable storage medium of claim 16, wherein the second network device downstream from the first network device along the at least one network flow path is the at least one egress network border device.

18. The tangible, non-transitory computer readable storage medium of claim 16, wherein the instructions operable to generate the flow statistics specific to the first network device along the at least one network flow path comprise instructions operable to generate one or more of a queue length, a queue delay, a packet loss estimation, or a bandwidth utilization estimation.

19. The tangible, non-transitory computer readable storage medium of claim 16, wherein the instructions operable to generate the flow statistics specific to the first network device along the at least one network flow path comprise instructions operable to:
determine an input flow to the first network device along the at least one network flow path;
compute an enqueuing rate of the first network device along the at least one network flow path; and
determine an output flow of a queue of the first network device along the at least one network flow path.

20. The tangible, non-transitory computer readable storage medium of claim 16, wherein the instructions operable to generate the flow statistics specific to the first network device along the at least one network flow path comprise instructions operable to generate the flow statistics specific to the first network device from flow statistics for a plurality of ingress network border devices.

* * * * *